Oct. 30, 1951  E. K. NICKERSON  2,573,648
VALVE
Filed Oct. 4, 1948

INVENTOR.
Elmer K. Nickerson
BY
Ross & Ross
Attys

Patented Oct. 30, 1951

2,573,648

UNITED STATES PATENT OFFICE 2,573,648

VALVE

Elmer K. Nickerson, Springfield, Mass., assignor to The Chapman Valve Manufacturing Co., Indian Orchard, Springfield, Mass., a corporation of Massachusetts Application October 4, 1948, Serial No. 52,621

2 Claims. (Cl. 251—17)

This invention relates to improvements in valves and is directed more particularly to tilting disc check valves incorporating means whereby the same may function as shut off valves.

The principal objects of the invention are directed to the provision of a combined check and shut off valve structure adapted and arranged whereby the valve may function as a check valve as in a line from a pump or the like or the valve may function as a throttle or shut off valve, all as may be desired.

According to novel features of my invention, a disc is pivoted in the waterway of a valve body on an axis somewhat upwardly of the center of the disc so that the disc is freely swingable for the check valve function while novel means is provided to move the disc to and hold it against its seat.

Figure 1:
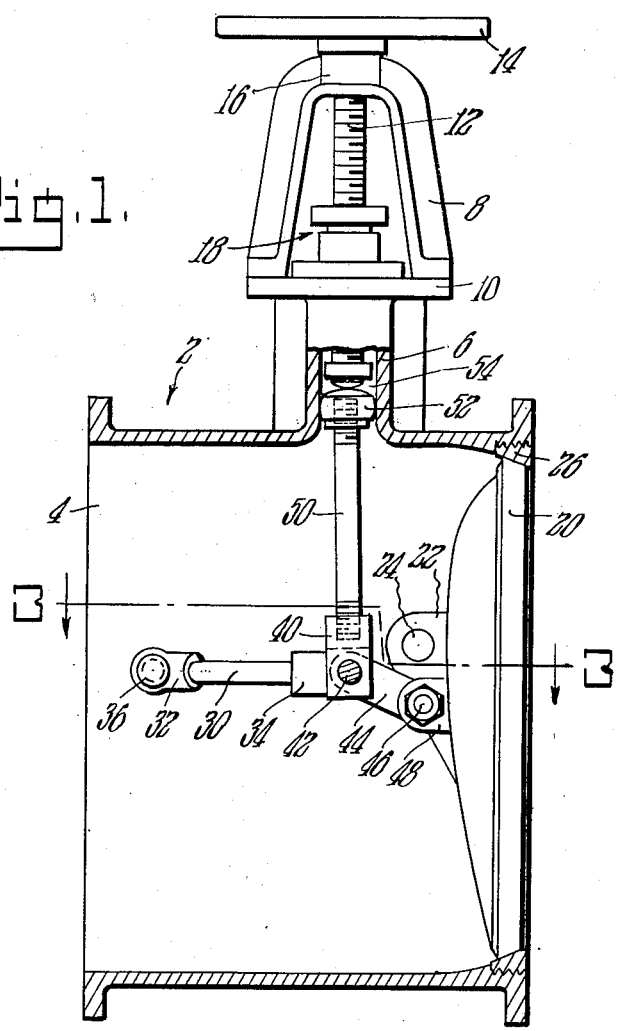
Figure 2:
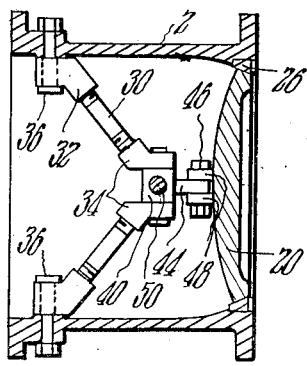

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Fig. 1 is a partial elevational and vertical sectional view through a valve construction embodying the novel features of the invention, and Fig. 2 is a small scale sectional plan view on the line 2—2 of Fig. 1.

Referring now to the drawings more in detail, the invention will be fully described.

A body is represented by 2 which has a waterway 4 therethrough and a hollow upper neck portion 6. A yoke 8 is secured to a flange 10 of the portion 6 and a spindle or stem 12 carrying a hand wheel 14 is in screw threaded engagement with a portion 16 of the yoke.

A stuffing box 18 of usual form is provided through which the stem 12 is reciprocable up and down.

A disc 20 has ears 22 pivoted on pivot pins 24 fixed to the body and extending into the waterway at its opposite sides so as to be swingable onto and away from a seat 26 which is associated with the body at the inlet side of the waterway.

Horizontal thrust rods 30 are provided which have threaded ends threadedly engaging outer arms 32 and inner arms 34. The arms 32 are pivoted on members 36 carried by the body at opposite sides of the waterway and rearwardly of the disc 20.

A central connector 40 has a transverse pivot 42 on which the arms 34 are pivoted and a link 44 has one end pivoted on said pivot 42 and its opposite end pivoted on a pivot 46 between ears 48 extending rearwardly of the disc 20.

A vertical thrust rod 50 has a lower threaded end in threaded engagement with member 40. A head member 52 is in threaded engagement with the upper end of rod 50 and is freely slidable up and down in a bore 54 of neck 6.

In the position of the parts shown the stem 12 is in its lower position. Its lower end bears on the head member 52 and through thrust rod 50 it exerts a downward force onto member 40 so that through the thrust rods 30 and link 44 the disc is forced to and held against its seat.

By downward pressure of the stem there is a toggle action of the parts or a wedging action so that pressure is applied to the disc in a horizontal direction. With pressure against the disc at its outer side or inlet side of the valve, swinging of the disc inwardly is prevented by forces applied to the disc directly in opposition to the pressure against it.

That is the forces acting on the disc holding it closed are applied thereto in alignment with the forces tending to swing it to open position rather than angularly. With the stem in an upper position and which may be accomplished by rotating the wheel 14, the disc 20 is free to swing on its pivot pins 24 and function as a check valve.

The disc is shown as being held in closed position but by limiting upward movement of the member 50 by the stem swinging of the disc to an intermediate throttling position may be accomplished.

The threaded connections between the components provides adjustment of the parts so that the wedging or toggle action may be varied as desired.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A combined check and shut-off valve construction comprising in combination, a body having a horizontal waterway therethrough and a vertically extending neck portion provided with a bore extending vertically upwardly from said waterway, a seat at one end of said waterway, a disc in said waterway pivoted at its opposite sides intermediate lower and upper sides thereof and at its inner rear side on pivot pins fixed to the body and extending into opposite sides of the waterway for rotating between a vertical closed position on said seat and an open substantially horizontal position away therefrom, a stem having a lower end in said bore and upper screw thread means carried by said stem and the upper end of said neck portion of the body whereby the lower end of the stem may be moved up and down in said bore by rotation of said stem, a central connecting member in said waterway rearwardly of said disc, a link and pivotal connections between opposite ends of said link and said central member and rear side of said disc respectively for positively pivotally connecting said member and disc, a vertical thrust rod extending upwardly from said connecting member having an upper end portion in said bore and being below and engageable by the lower end of said stem, a pair of horizontal thrust members in the waterway, pivotal connecting means between inner ends of said thrust members and said central member and pivotal connecting means between outer ends of said thrust members and said body for positively pivotally connecting said central member and body, said horizontal thrust rods relatively diverging rearwardly from said central member, all adapted and arranged whereby said stem may be moved downwardly in the bore to move said vertical thrust rod and central member downwardly and through said link and horizontal thrust rods to move and hold the disc on said seat or be moved upwardly so that said disc may rotate inwardly from closed position.

2. A combined check and shut-off valve construction comprising in combination, a body having a horizontal waterway therethrough and a vertically extending neck portion provided with a bore extending vertically upwardly from said waterway, a seat at one end of said waterway, a disc in said waterway pivoted at its opposite sides intermediate lower and upper sides thereof and at its inner rear side on pivot pins fixed to the body and extending into opposite sides of the waterway for rotating between a vertical closed position on said seat and an open substantially horizontal position away therefrom, a stem having a lower end in said bore and upper screw thread means carried by said stem and the upper end of said neck portion of the body whereby the lower end of the stem may be moved up and down in said bore by rotation of said stem, a central connecting member in said waterway rearwardly of said disc, a link and pivotal connections between opposite ends of said link and said central member and rear side of said disc respectively for positively pivotally connecting said member and disc, a vertical thrust rod extending upwardly from said connecting member having an upper end portion in said bore and being below and engageable by the lower end of said stem, a pair of horizontal thrust members in the waterway, pivotal connecting means between inner ends of said thrust members and said central member and pivotal connecting means between outer ends of said thrust members and said body for positively pivotally connecting said central member and body, said horizontal thrust rods relatively diverging rearwardly from said central member, all adapted and arranged whereby said stem may be moved downwardly in the bore to move said vertical thrust rod and central member downwardly and through said link and horizontal thrust rods to move and hold the disc on said seat or be moved upwardly so that said disc may rotate inwardly from closed position, said pivotal connecting means including arms threadedly adjustable on the ends of said horizontal thrust rods swingable on pivot members on said central member and body.

ELMER K. NICKERSON.

REFERENCES CITED

The following references are of record in the file of this patent:

UNITED STATES PATENTS

| Number | Name | Date |
|---|---|---|
| 1,588,752 | Lang | June 15, 1926 |
| 2,058,590 | Jefferson | Oct. 27, 1936 |

FOREIGN PATENTS

| Number | Country | Date |
|---|---|---|
| 2,490 | Great Britain | 1906 |
| 63,422 | Germany | 1892 |